(12) United States Patent
De Vries et al.

(10) Patent No.: US 10,071,709 B2
(45) Date of Patent: Sep. 11, 2018

(54) ELECTROPNEUMATIC WINDSHIELD WIPER DRIVE FOR A RAIL VEHICLE, DRIVE FOR A WINDSHIELD WIPER AND PNEUMATIC SYSTEM FOR OPERATING A DRIVE FOR A WINDSHIELD WIPER

(71) Applicant: KNORR-BREMSE SYSTEME FÜR SCHIENENFAHRZEUGE GMBH, Munich (DE)

(72) Inventors: Gerhardus De Vries, Mödling (AT); Gerd Noll, Vienna (AT); Wolfgang Maglot, Traiskirchen (AT)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 484 days.

(21) Appl. No.: 14/442,569

(22) PCT Filed: Nov. 15, 2013

(86) PCT No.: PCT/EP2013/073898
§ 371 (c)(1),
(2) Date: May 13, 2015

(87) PCT Pub. No.: WO2014/076220
PCT Pub. Date: May 22, 2014

(65) Prior Publication Data
US 2016/0288771 A1 Oct. 6, 2016

(30) Foreign Application Priority Data

Nov. 19, 2012 (DE) ........................ 10 2012 111 127

(51) Int. Cl.
*F15B 20/00* (2006.01)
*B60S 1/10* (2006.01)
*F15B 15/06* (2006.01)

(52) U.S. Cl.
CPC .............. *B60S 1/10* (2013.01); *F15B 20/008* (2013.01); *F15B 15/065* (2013.01);
(Continued)

(58) Field of Classification Search
CPC ...................... B60S 1/10; F15B 20/008; F15B 2211/30565; F15B 2211/7725;
(Continued)

(56) References Cited

U.S. PATENT DOCUMENTS 2,750,931 A * 6/1956 Penrod ...................... B60S 1/12
91/182
3,672,260 A 6/1972 Gachot et al.
5,960,695 A * 10/1999 Aardema ............... F15B 11/006
137/596.17

FOREIGN PATENT DOCUMENTS

CN 2900270 Y 5/2007
CN 201012675 Y 1/2008
(Continued)

OTHER PUBLICATIONS

Machine translation to English of FR2738789. 1997.*
(Continued)

*Primary Examiner* — F. Daniel Lopez
*Assistant Examiner* — Michael Quandt
(74) *Attorney, Agent, or Firm* — Barnes & Thornburg LLP

(57) ABSTRACT

A pneumatic system for operating a drive for a windshield wiper for a rail vehicle, wherein the windshield wiper drive has a piston guide device that has a first connection and a second connection opposite the first connection. At least one piston in the piston guide device carries out linear movements in opposite directions along the main direction of extension of the piston guide device to bring about an alternating rotational movement of the wiper shaft. The (Continued)

pneumatic system has a supply connection for a compressed air supply, wherein the supply connection is connected to the first connection via a first normal operation connection line and a first emergency operation connection line arranged parallel thereto and to the second connection via a second normal operation connection line and a second emergency operation connection line arranged parallel thereto.

12 Claims, 5 Drawing Sheets

(52) U.S. Cl.
CPC ............... *F15B 2211/30565* (2013.01); *F15B 2211/6336* (2013.01); *F15B 2211/665* (2013.01); *F15B 2211/7725* (2013.01); *F15B 2211/8636* (2013.01); *F15B 2211/8757* (2013.01); *F15B 2211/8855* (2013.01)

(58) Field of Classification Search
CPC ...... F15B 2211/8757; F15B 2211/8855; F15B 15/065
USPC .................................. 60/370; 91/7, 339, 509
See application file for complete search history.

(56) References Cited

FOREIGN PATENT DOCUMENTS

| | | |
|---|---|---|
| CN | 102371973 A | 3/2012 |
| DE | 491172 C | 2/1930 |
| DE | 2239006 B1 | 11/1973 |
| DE | 2359914 A1 | 6/1975 |
| DE | 4343216 A1 | 6/1995 |
| EP | 0658461 A1 | 6/1995 |
| FR | 817653 A | 9/1937 |
| FR | 2738789 A1 | 3/1997 |
| GB | 1500404 | 2/1978 |

OTHER PUBLICATIONS

Chinese Office Action for Chinese Application No. 201380069912.8, dated May 5, 2016.
Written Opinion of the International Search Authority and International Search Report for International Patent Application No. PCT/EP2013/073898 dated Nov. 15, 2013.
Zhou, Database WPI, Week 201022, Thomson Scientific, XP00271964.8, May 16, 2007.
Search Report for German Patent Application No. 10 2012 111 127.8; dated Jul. 19, 2013.
Search Report for International Patent Application No. PCT/EP2013/073898; dated Apr. 10, 2014.

\* cited by examiner

ELECTROPNEUMATIC WINDSHIELD WIPER DRIVE FOR A RAIL VEHICLE, DRIVE FOR A WINDSHIELD WIPER AND PNEUMATIC SYSTEM FOR OPERATING A DRIVE FOR A WINDSHIELD WIPER

PRIORITY CLAIM

This patent application is a U.S. National Phase of International Patent Application No. PCT/EP2013/073898, filed 15 Nov. 2013, which claims priority to German Patent Application No. 10 2012 111 127.8, filed 19 Nov. 2012, the disclosures of which are incorporated herein by reference in their entirety.

FIELD

Disclosed embodiments relate to an electropneumatic windshield wiper drive for a rail vehicle, to a drive for a windshield wiper, to a pneumatic system for operating the drive, to a method for controlling the pneumatic system, and to a corresponding computer program product.

BRIEF DESCRIPTION OF THE FIGURES

Disclosed embodiments will be discussed in more detail below with reference to the appended drawings, in which.

DETAILED DESCRIPTION OF THE DISCLOSED EMBODIMENTS

Figure 1:
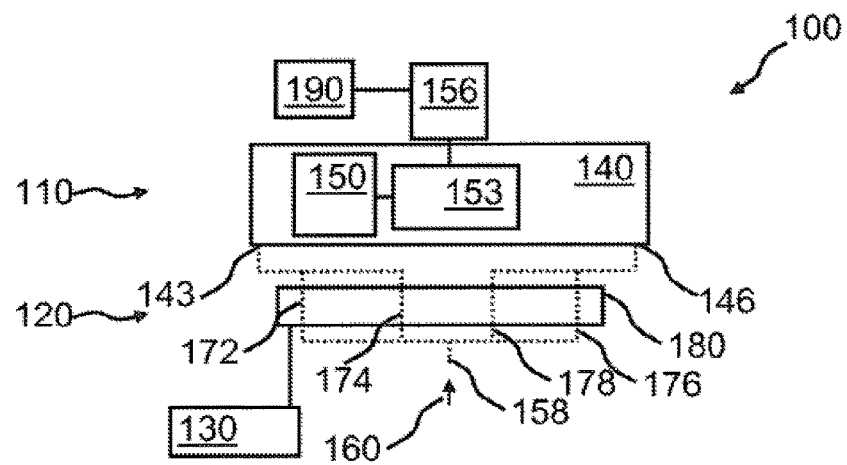
FIG. 1 is a schematic illustration of an electropneumatic windshield wiper drive for a rail vehicle according to an exemplary embodiment.

Disclosed embodiments provide an improved pneumatic system for operating a drive for a windshield wiper for a rail vehicle, an improved drive for a windshield wiper for a rail vehicle, a method for controlling the pneumatic system, a corresponding apparatus, a corresponding computer program product, and an electropneumatic windshield wiper drive for a rail vehicle.

Safe and reliable operation of a windshield wiper drive can be made possible in that a piston guide device for driving a windshield wiper can be realized by way of normal-operation connection lines and emergency-operation connection lines which are implemented in parallel and which in turn can be operated by way of a correspondingly designed pneumatic system. Even if a valve of the pneumatic system fails during normal operation, it is possible for reliable emergency operation to be ensured by way of the additionally provided emergency-operation connection lines. Here, the use of standard components for the pneumatic system permits an inexpensive solution.

A pneumatic system for operating a drive for a windshield wiper for a rail vehicle is proposed, wherein the drive has a piston guide device and a power transmission device, wherein the piston guide device has a first port and a second port situated opposite the first port and has a piston which is arranged in the piston guide device and which is designed to perform mutually opposite linear movements along the main direction of extent of the piston guide device, and wherein the power transmission device is designed to transmit the mutually opposite linear movements of the at least one piston to a wiper shaft to effect an alternating rotational movement of the wiper shaft, and wherein the pneumatic system has the following features:

a first normal-operation connection line and, parallel thereto, a first emergency-operation connection line which are designed to connect a supply port for a compressed-air supply of the pneumatic system to the first port of the drive;

a second normal-operation connection line and, parallel thereto, a second emergency-operation connection line which are designed to connect the supply port to the second port of the drive; and a valve device which is designed such that, during normal operation of the pneumatic system, the valve device couples the supply port to the first port via the first normal-operation connection line and to the second port via the second normal-operation connection line to effect the alternating rotational movement of the wiper shaft, and is designed such that, during emergency operation of the pneumatic system, the valve device couples the supply port to the first port via the first emergency-operation connection line and to the second port via the second emergency-operation connection line to effect the alternating rotational movement of the wiper shaft.

A rail vehicle may be understood generally to mean a rail-bound vehicle, such as a locomotive, a rail motor unit, a rail motor coach, a streetcar, a subway railroad vehicle, a wagon such as a passenger and/or freight carriage. In particular, the rail vehicle may be a high-speed rail vehicle. In a further disclosed embodiment, the windshield wiper drive may also be used for a utility vehicle and/or for an industrial truck. The rail vehicle may have at least one electropneumatic windshield wiper drive. A pneumatic system may be understood to mean an apparatus which uses compressed air to perform mechanical work. A drive may be driven by the pneumatic system. A drive for a windshield wiper may be understood to be a windshield wiper drive. The drive can move a windshield wiper and may be designed to effect linearly oscillating axial movements of the wiper shaft. An alternating rotational movement may be understood to mean a linearly oscillating axial movement of a shaft, in particular of a wiper shaft. A windshield wiper may be understood to mean an apparatus for cleaning a window, in particular a front window, for example of a rail vehicle. A windshield wiper may be composed of a wiper arm, a wiper blade, a wiper spindle and a drive. The pneumatic system may be attached to a compressed-air supply or connected to a compressed-air supply. The compressed-air supply may provide an air pressure, for example in a range from 7-10 bar. In at least one disclosed embodiment, the compressed-air supply may provide an air pressure in a tolerance range around eight bar. In at least one disclosed embodiment, the compressed-air supply may provide an air pressure in a tolerance range around nine bar. The pneumatic system may have a valve device. The valve device may have a multiplicity of interconnected valves to realize required functionality of the pneumatic system. The drive may have a piston guide device, wherein, in the piston guide device, at least one piston is arranged such that, by way of inflowing compressed air which via a first port at one end of the piston guide device and, in alternation therewith, via a second port at that end of the piston guide device which is situated opposite the one end, a linear movement along the main direction of extent of the piston guide device can be attained. The piston guide device may be of cylindrical or tubular form, and the main direction of extent may correspond to a longitudinal axis of the piston guide device. Thus, an interior space of the piston guide device is divided by the at least one piston into two chambers. In at least one disclosed embodiment, use may be made of two pistons which are coupled to one another, wherein one piston faces toward the first port and the other piston faces toward the second piston. A power transmission device for transmitting the mutually opposite linear movements of the at least one piston can effect a rotational movement of the wiper shaft. The pneumatic system can, for the operation of the windshield wiper, be connected to the first port and to the second port of the drive. In this case, a first normal-operation connection line and a first emergency-operation connection line may be connected to the first port, and a second normal-operation connection line and a second emergency-operation connection line may be connected to the second port. The pneumatic system may be designed to operate the drive in two different operation modes. In a normal operation mode, the drive can be operated by means of the first normal-operation connection line and the second normal-operation connection line. In an emergency operation mode, the drive can be operated by means of the first emergency-operation connection line and the second emergency-operation connection line. The valve device can accordingly be designed to block the emergency-operation connection lines in the normal operation mode and to block the normal-operation connection lines in the emergency operation mode. The valve device can be designed to conduct compressed air present at the supply port of the compressed-air supply alternately to the first port and to the second port both in the normal operation mode and in the emergency operation mode.

In at least one disclosed embodiment, the valve device may have four normal-operation valves, at least two emergency-operation valves, and at least one further emergency-operation valve. In this case, a first and a third normal-operation valve of the four normal-operation valves and at least one of the at least two emergency-operation valves may be assigned to the first normal-operation connection line. A second and a fourth normal-operation valve and at least one other of the at least two emergency-operation valves may be assigned to the second normal-operation connection line. The at least one further emergency-operation valve may be assigned to the first and to the second emergency-operation connection line.

A normal-operation valve may be understood to be a 3/2 directional valve. The at least two emergency-operation valves may be 3/2 directional valves. The further emergency-operation valve may be understood to be a 5/3 directional valve with a blocking zero position, a forward position and a reverse position. The at least two emergency-operation valves may exhibit free throughflow in the zero position. The third normal-operation valve and the fourth normal-operation valve may exhibit free throughflow in the zero position. In the first normal-operation valve and the second normal-operation valve, it is possible for the inflow to be blocked in the zero position. A zero position may be understood to mean a rest state of a valve. A normal-operation valve may be designed as a valve with electromagnetic actuation and a return spring. An emergency-operation valve may be designed as a valve with electromagnetic actuation and a return spring. In the zero position, the electromagnet may be inactive. The four normal-operation valves, the at least two emergency-operation valves and/or the at least one further emergency-operation valve may be solenoid valves. Reliable emergency operation can be ensured by way of such an embodiment of the valves.

Two cylinder chambers may be arranged in the piston guide device. A cylinder chamber may be understood to mean a chamber which is formed between an inner wall of the piston guide device, the piston and a cylinder cover of the piston guide device. Within the cylinder chamber, the piston can move linearly in the piston guide device. The valve device may be composed of multiple normal-operation solenoid valves. Of these, in each case two may be assigned to one cylinder chamber, and the further two may be assigned to the other cylinder chamber. Assignment to a cylinder chamber may be realized via the first port and the second port respectively. Aside from the normal-operation valves, the system also has at least three further emergency-operation valves, or at least two emergency-operation valves and one further emergency-operation valve. The further emergency-operation valve serves for the alternative activation of the compressed-air supply to one of the two cylinder chambers. At the same time, the valve also opens up the air outlet of the other cylinder chamber. It is for example possible for the compressed-air flow direction to be changed at intervals of seconds. Here, it is then possible for the previously aerated cylinder chamber to be flooded with the discharge duct, and for that cylinder part which was previously connected to the discharge duct to be flooded with compressed air. The at least two further solenoid valves serve for reliable deactivation of the air inlet and discharge lines of the normal-operation valves.

The first port and the second port may be assigned in each case at least one normal-operation valve and at least one emergency-operation valve, arranged in parallel with the at least one normal-operation valve, which are designed and arranged such that an inflow of air and/or a discharge of air at the associated port can, in a normal operation mode, be shut off by means of the in each case at least one normal-operation valve and can, at the same time or alternatively, in an emergency operation mode, be shut off by means of the in each case at least one emergency-operation valve, wherein it is possible to switch between alternating activation of the first port and of the second port.

In at least one disclosed embodiment, the first normal-operation valve, the third normal-operation valve and the at least one further emergency-operation valve may be arranged in parallel and connected to the first port. The second normal-operation valve, the fourth normal-operation valve and the at least one further emergency-operation valve may be arranged in parallel and connected to the second port. Here, the first normal-operation valve is connected to a first emergency-operation valve of the at least two emergency-operation valves. The second normal-operation valve may be connected to a second emergency-operation valve of the at least two emergency-operation valves. The third normal-operation valve may be connected to a third emergency-operation valve of the at least two emergency-operation valves. The fourth normal-operation valve may be connected to a fourth emergency-operation valve of the at least two emergency-operation valves. The first emergency-operation valve, the second emergency-operation valve and the at least one further emergency-operation valve may be connected to the supply port for the compressed-air supply. The first port may be connected by way of the third normal-operation valve and the third emergency-operation valve, and at the same time or alternatively by way of the at least one further emergency-operation valve, to the supply port for the compressed-air supply.

In at least one disclosed embodiment, an additional solenoid valve may be connected downstream of the supply port. In the zero position of the additional solenoid valve, a throttle may be connected downstream of the additional solenoid valve. A throttle may be understood to mean a throttle valve. A throttle may be understood to mean an apparatus for restricting the throughflow. The throttle may have a constriction. The constriction of the throttle may be adjustable. The throughflow, and at the same time or alternatively the pressure gradient, at the throttle may be adjustable. The solenoid valve may be a 3/2 directional valve, wherein an inlet may be connected to the supply port for the compressed-air supply. The throttle may be connected downstream of an outlet of the solenoid valve. Here, the outlet of the throttle and the second outlet of the solenoid valve may be connected to one another, and designed in each case for providing compressed air for the pneumatic system.

According to at least one disclosed embodiment, the four normal-operation valves may be 3/2 directional valves, and at the same time or alternatively, the at least two emergency-operation valves may be 3/2 directional valves, and at the same time or alternatively, the further emergency-operation valve may be a 5/3 directional valve. Here, the at least two emergency-operation valves may be designed so as to exhibit free throughflow in the zero position. The first and the second normal-operation valve may be designed such that the inflow is blocked in the zero position, and the third normal-operation valve and fourth normal-operation valve may be designed so as to exhibit free throughflow in the zero position. The further emergency-operation valve may have a blocking zero position, a forward position and a reverse position, wherein the supply port for the compressed-air supply and at the same time or alternatively exhaust air can be shut off by way of the at least two emergency-operation valves in the activated state.

It is advantageously possible for the complexity of the components and the number of components to be restricted to a minimum. In this case, a multiplicity of standardized components may be used. Furthermore, a compact structural space can be attained because, by comparison with the known solutions, no additional control piston and/or damper piston is used. In the event of failure of a valve required for normal operation, control is always possible by way of the emergency-operation valves. It is advantageous, and inexpensive, if standard components can be used, and no substantial special components have to be used.

A drive for a windshield wiper for a rail vehicle is proposed, which drive has the following features:
a piston guide device with a first port and with a second port situated opposite the first port;
two pistons which are coupled to one another and arranged in the piston guide device and which are designed to perform linear movements along the main direction of extent of the piston guide device; and
a power transmission device for transmitting the linear movements of the two pistons to a wiper shaft to effect an alternating rotational movement of the wiper shaft.

The drive for a windshield wiper may also be referred to as a windshield wiper drive. The two pistons of the drive can jointly move back and forth in alternating fashion in the piston guide device, that is to say can alternately perform mutually opposite linear movements. Here, the pistons can firstly move jointly in one direction and can subsequently move jointly in the opposite direction. The power transmission device may be a connecting-rod connection between the two pistons. Here, a first of the two pistons may be connected by means of a connecting rod to a crank rod, and the second piston of the two pistons may be connected by means of a further connecting rod to the crank rod. The crank rod may be designed to effect an alternating rotational movement of the wiper shaft. The connecting rod may be designed to produce a connection between the wiper shaft and pistons. The connecting rod can transform a linear movement of the piston into a circular movement of the wiper shaft. The connecting rod can thus convert alternating mutually oppositely directed linear movements of the two pistons into a linearly oscillating axial movement of the wiper shaft.

The drive may be realized by way of a component-reducing concept in which, through the use of correspondingly designed regulating electronics, solenoid valves, that is to say normal-operation valves and/or emergency-operation valves, are controlled such that the drive on the working pistons is reduced, and no control piston or damper piston is additionally used.

An advantage of the electropneumatic drive is a limitation of the complexity of the parts, and also of the number of components, to the absolute minimum. It is possible to dispense with components that are complex from a manufacturing aspect, and use is made of the standardized cylinders such as are known in large unit quantities as extruded profiles. Without a control piston and/or a damper piston, it is possible for structural space to be saved in relation to windshield wiper drives which use these, and the space can be utilized for the valve device. Here, the fitting of the valve device can ensure not only the elimination of additional structural space but also the advantage of short line lengths, and thus operation of the wiper drive with reduced delay time.

It is advantageously possible for a rotational angle sensor or for a signal generated by a rotational angle sensor to be used for identifying the position of the wiper arm. A rotational angle sensor of the type, which is coupled to the wiper shaft or to a mechanical component that is coupled to the wiper shaft, offers the advantage that the present position of the wiper arm can, at all times, be known and used for the regulation of the solenoid valves in the normal-operation function. Thus, aside from the end positions of the wiper arm, any desired intermediate position can be set. Accordingly, it is possible without additional outlay for any intermediate position of the wiper arm to be realized, such as for example central position, wash tunnel position or resetting operation.

It is advantageously not possible for a defect of one of the normal-operation valves to lead to failure of the emergency operation. In the case of the proposed circuit layout with redundant lines, not even a complete failure of the normal-operation valves can impair the emergency-operation function. By means of the at least two emergency-operation valves, which may exhibit shut-off valve functionality, the compressed-air inlet and also the compressed-air outlet of the normal-operation valves can be reliably shut off. The emergency-operation function can thus be implemented entirely independently of the state and any possible fault of the normal-operation control.

The power transmission from the cylinder chambers can be realized in a variety of ways. Either a combination of toothed rack with toothed segment may be used, or a directly rotatably mounted connecting rod may be provided. The advantage of the rotatably mounted connecting rod in relation to the former embodiment is the reduction in noise generated by the rolling of the teeth during the movement. No friction surfaces are provided, and thus the wear at the contact surfaces or friction surfaces is also eliminated. In the case of the connecting rod, the movement is realized not by way of friction of static contact surfaces but by way of the contact of rotatably mounted parts and contact points.

A method for controlling a pneumatic system for operating a drive for a windshield wiper for a rail vehicle is proposed, wherein the method has the following steps:
deciding whether the pneumatic system will be operated in the operation mode of normal operation or in the operation mode of emergency operation;
controlling the valve device such that a supply port for the compressed-air supply of the pneumatic system is coupled via the first normal-operation connection line to the first port of the drive and the second port is coupled to an air outlet, and in alternation therewith, the supply port is coupled via the second normal-operation connection line to the second port of the drive and the first port is coupled to an air outlet, to effect the alternating rotational movement of the wiper shaft which can be driven by the drive, when the pneumatic system is operated in the operation mode of normal operation; and
actuating the valve device such that the supply port is coupled via the first emergency-operation connection line to the first port and the second port is coupled to an air outlet, and in alternation therewith, the port for the compressed-air supply is coupled via the second emergency-operation connection line to the second port and the first port is coupled to an air outlet, to effect the alternating rotational movement of the wiper shaft which can be driven by the drive, when the pneumatic system is operated in the operation mode of emergency operation.

The method for controlling a pneumatic system for operating a drive for a windshield wiper, or in other words the regulation of the described drive, may be based on the continuous measurement of the wiper arm position and of the change of the position over time. The regulation used may be based on the principle of a fuzzy regulator, in which the fuzzy rules for the control of the normal-operation solenoid valves can be defined and, using the defuzzification, the required control commands for the valves can be generated. It is thus possible to realize run-time-optimized regulation of the wiper drive and of the wiper arm mounted thereon with the wiper blade. Disturbances that may act on the system during operation, such as for example traveling speed, vehicle counterpressure, wetting of the window or variations in the compressed-air supply, can be compensated immediately, or within a few strokes, by way of the proposed fuzzy regulation.

An apparatus for controlling a pneumatic system for operating a drive for a windshield wiper for a rail vehicle is proposed, wherein the apparatus has devices designed for executing a method for controlling an electromagnetic windshield wiper drive for a rail vehicle.

An apparatus may be understood to mean an electrical device which processes sensor signals and, as a function thereof, outputs control signals for controlling the pneumatic system. The apparatus may have one or more suitable interfaces which may be embodied as hardware and/or software. In the case of a hardware embodiment, the interfaces may be part of an integrated circuit in which functions of the apparatus are implemented. The interfaces may also be dedicated integrated circuits or may be composed at least partially of discrete components. In the case of a software embodiment, the interfaces may be software modules which are present for example on a microcontroller in addition to other software modules.

Also advantageous is a computer program product with program code which may be stored on a machine-readable carrier such as a semiconductor memory, a hard drive memory or an optical memory and which is used for carrying out the method according to one of the disclosed embodiments described above when the program product is executed on a computer or an apparatus.

An electropneumatic windshield wiper drive for a rail vehicle is proposed which has the following features:
a drive for a windshield wiper for a rail vehicle having a piston guide device and a power transmission device, wherein the piston guide device has a first port and a second port situated opposite the first port and has at least one piston which is arranged in the piston guide device, wherein the piston is designed to perform mutually opposite linear movements along the main direction of extent of the piston guide device, wherein the power transmission device is designed to transmit the mutually opposite linear movements of the at least one piston to a wiper shaft to effect an alternating rotational movement of the wiper shaft; and
a pneumatic system for operating the drive for a windshield wiper for a rail vehicle.

The electropneumatic windshield wiper drive may furthermore have a control unit for controlling the pneumatic system. The electropneumatic windshield wiper drive may, in a manner dependent on the pneumatic system or on the control unit controlling the pneumatic system, charge the piston guide device of the drive with compressed air at the required locations and, in a manner dependent on the application of compressed air, perform a movement to one side or the other side.

The drive may have a piston chamber, or a piston guide device, and a freely movable piston to which a toothed rack is fastened. The arrangement of piston chamber and freely movable piston may also be referred to as working piston. A toothed segment can engage into the toothed rack. The toothed segment may be rigidly connected to the wiper shaft. A movement of the piston can thus result in a rotational movement of the wiper shaft.

The drive may also be designed differently, for example using connecting rods instead of a toothed rack.

In at least one disclosed embodiment, a rotational angle sensor may be situated on or operatively connected to the wiper shaft and serve for detecting the position of the wiper shaft for example in the two end positions and/or in any other position. The signals of the rotational angle sensor can be transmitted via an interface to the control unit or a control device. With the signals of the rotational angle sensor it is for example possible to realize the operation mode intervals.

It is advantageous that, through the use of a rotational angle sensor, a suitable pneumatic system and an associated control device, reliable operation of and an inexpensive solution for a windshield wiper drive for a rail vehicle can be realized.

The proposed electropneumatic windshield wiper drive for a rail vehicle can advantageously offer a construction that has a reduced number of components and the omission of control piston and damper piston in relation to known solutions. The use of standardized profile cylinders composed of extruded profiles as piston guide device or piston chamber can offer a cost advantage. In the two sides of the piston guide device of the working piston there may be situated dampers, in particular plastics dampers, which can serve as stop buffers for the "park" operation mode and for movement limitation in the emergency operation mode. In the normal-operation function, it is possible by way of the regulation to prevent an abutment of the piston, for example of a cylinder piston, against the end position buffers.

A position of the wiper shaft may be detected by way of a continuous rotational angle sensor, optionally with an electrical interface but not restricted to this. The drive unit may be mounted directly on the valve device, but is not restricted to this mounting location. It is however advantageously possible for the valve device to be positioned in the direct vicinity of the drive.

It is advantageously possible for four normal-operation valves to be used for the inlet to and outlet from the two cylinder sides. Through the use of at least two emergency-operation solenoid valves and a further emergency-operation valve, the at least two emergency-operation valves can shut off the inflow to and outflow from the normal-operation valves. Furthermore, the further emergency-operation valve can, by cyclic alternation of the supply of compressed air to one of the two cylinder sides and connection of the respective other cylinder side to the air outlet, permit a temporally defined wiping function as emergency operation without the use of regulation logic.

The electropneumatic windshield wiper drive may provide the use of a control unit which uses logic based on fuzzy rules, or some other manner of regulation and control signal generation. Regulation of the number of double strokes, that is to say the number of back and forth movements of the wiper arm, may be realized by way of a further solenoid valve with a throttle connected downstream. The number of double strokes may be controlled such that the wiper arm pauses in the respective reversal position after performing half of a double wiping stroke or a complete double wiping stroke.

The power transmission in the power transmission device may be realized by way of a toothed rack or a toothed segment connection or by way of a connecting-rod embodiment.

Connection of the compressed-air supplies may be realized by way of central ports on the wiper drive unit. A central port of the compressed-air supply may be a pneumatic port on the mounting plate, but is not restricted only to this position or location. The port for the compressed-air outlet may be positioned at a central point on the valve plate or on the mounting plate, or the electropneumatic windshield wiper drive may be designed so as to provide a direct discharge via a silencer, wherein the port for the compressed-air outlet may not be restricted exclusively to the described locations.

The electrical supply of the solenoid valves in the normal-operation function and in the emergency-operation function, and of the signal from the rotational angle encoder, may be realized at a plug connector at a cable outlet or on the mounting plate, but is not restricted exclusively to the described locations.

In at least one disclosed embodiment, the electropneumatic windshield wiper drive may comprise a first tubular section, a second tubular section and a central module which may be arranged between a first end of the first tubular section and a first end of the second tubular section. That side of the first tubular section which is situated opposite the first end may be closed off, and may have the first port. That side of the second tubular section which is situated opposite the second end may be closed off and may have the second port. The tubular sections may each be closed off by way of end caps which each have an interface for a pneumatic line. A first piston arranged in the first tubular section, and a second piston arranged in the second tubular section, may be designed to perform mutually opposite linear movements along the main direction of extent of the tubular sections. A wiper shaft may be arranged in the central module, wherein a main axis of rotation of the wiper shaft may be oriented substantially perpendicular to the main direction of extent of the first and of the second tubular section. A rotational angle encoder may be operatively connected to the wiper shaft.

In the following description of the disclosed embodiments, identical or similar reference signs will be used for the elements of similar function illustrated in the various drawings, wherein a repeated description of the elements will be omitted.

FIG. 1 is a schematic illustration of an electropneumatic windshield wiper drive 100 for a rail vehicle according to an exemplary embodiment. The electropneumatic windshield wiper drive 100 comprises a drive 110 for a windshield wiper, a pneumatic system 120 for operating the drive 110 for the windshield wiper, and a control unit 130 for controlling the pneumatic system 120.

The drive 110 has a piston guide device 140 with a first port 143 and with a second port 146, at least one piston 150, a power transmission device 153 which is connected in terms of force action to the at least one piston 150, and a wiper shaft 156 which is connected in terms of force action to the power transmission device 153. The piston 150 is designed to perform a linear movement within the piston guide device 140, wherein the linear movement runs along the main direction of extent of the piston guide device 140. The piston 150 may be a double piston, which has two piston crowns directed oppositely to one another.

The pneumatic system 120 for operating the drive 110 for the windshield wiper has a supply port 158 for a compressed-air supply 160. The supply port 158 is connected to the first port 143 of the drive 110 by way of a first normal-operation connection line 172 and a first emergency-operation connection line 174, which extends in parallel with the first normal-operation connection line. Furthermore, the supply port 158 is connected to the second port 146 of the drive 110 by way of a second normal-operation connection line 176 and a second emergency-operation connection line 178, which extends in parallel with the second normal-operation connection line. The connection lines 172, 174, 176, 178 can be blocked by means of a valve device 180.

The valve device 180 is designed such that, both in normal operation and in emergency operation, it supplies compressed air from the compressed-air supply 160 to the drive 110 such that an alternating rotational movement of the wiper shaft 156 is attained. For this purpose, in a first step, the first port 143 is coupled to compressed air, such that the at least one piston 150 performs a linear movement from the first port 143 in the direction of the second port 146. For this purpose, the (compressed) air at the second port 146 is conducted to an air outlet and discharged. In a subsequent step, the second port 146 is coupled to compressed air, such that the at least one piston 150 performs a linear movement from the second port 146 in the direction of the first port 143. For this purpose, the (compressed) air at the first port 143 is conducted to an air outlet and discharged. The valve device 180 is designed such that, in normal operation, it conducts the compressed air via the first normal-operation connection line 172 and second normal-operation connection line 176 respectively. The valve device 180 is furthermore designed such that, in emergency operation, it blocks the first normal-operation connection line 172 and second normal-operation connection line 176 respectively, and realizes the control of the drive 110 by way of the first emergency-operation connection line 174 and the second emergency-operation connection line 178 respectively.

The electropneumatic windshield wiper drive 100 furthermore has a rotational angle sensor 190 which is operatively connected to the wiper spindle 156. The rotational angle sensor 190 is designed to provide a rotational angle of the wiper spindle 156 to the control unit 130 for the control of the pneumatic system 120.

The control unit 130 is designed to control the pneumatic system 120 for operating a drive 110 for a windshield wiper for a rail vehicle. The control unit may be designed to support two operation modes—normal operation and emergency operation. The control unit 130 has an interface which is designed for receiving at least a signal of a rotational angle sensor 190. The control unit 130 has an interface which is designed for outputting control signals for the control of the pneumatic system 120. Furthermore, the control unit 130 has devices for carrying out a method for the control of the pneumatic system 120. During normal operation, the control unit 130 outputs corresponding control signals at the interface for the control of the pneumatic system. The control signals may be configured so as to permit operation of the drive for a windshield wiper in accordance with ambient conditions.

Figure 2:
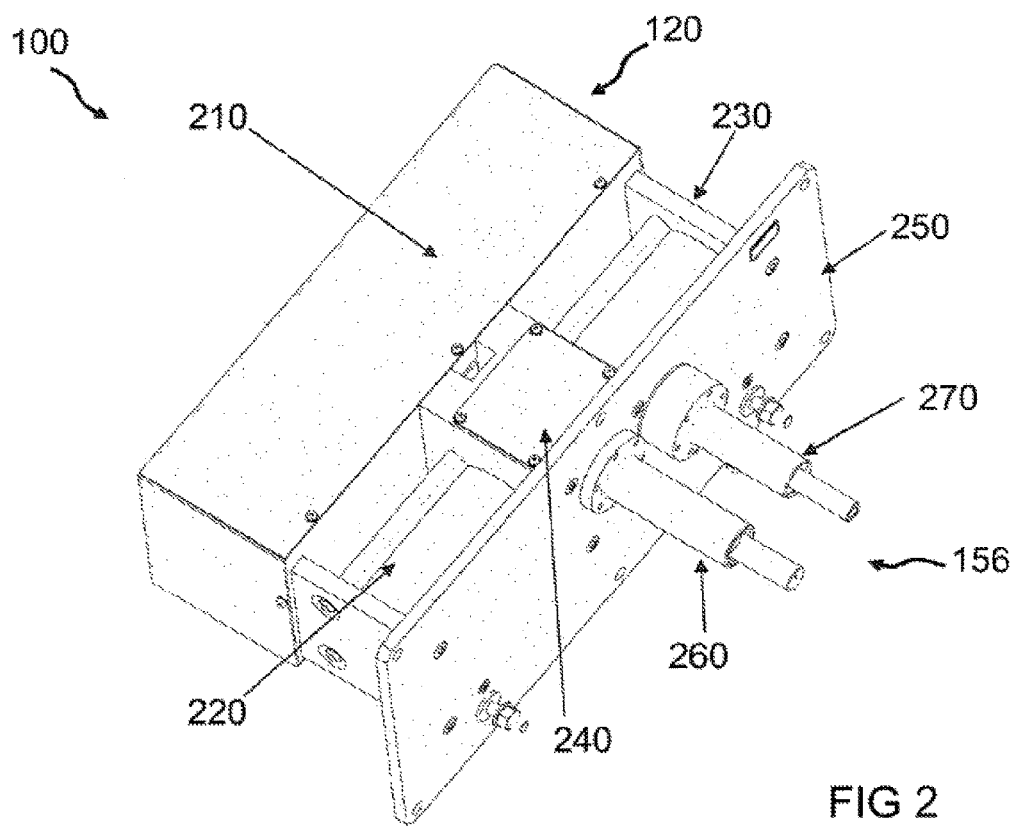
FIG. 2 is a schematic illustration of an electropneumatic windshield wiper drive for a rail vehicle according to an exemplary embodiment.

FIG. 2 is a schematic illustration of an electropneumatic windshield wiper drive 100 for a rail vehicle according to an exemplary embodiment. The electropneumatic windshield wiper drive 100 may correspond to the electropneumatic windshield wiper drive already shown in FIG. 1. The pneumatic system 120 is housed under a cover 210 for the pneumatic system 120. The drive 110 has, as piston guide device, a cylinder barrel 220 composed of an extruded profile, the two ends of which—at the end of the cylinder barrel 220 in its main direction of extent—are closed off by way of a respective cylinder cover 230. The cylinder barrel 220 has, in a central region, a central module 240. The cylinder cover 230 and the central module 240 are screwed to a mounting plate 250 which is arranged parallel to the main direction of extent of the cylinder barrel 220. Perpendicular to the mounting plate 250, there is arranged a main arm shaft 260 and a parallel arm shaft 270 arranged parallel to the main arm shaft. The main arm shaft 260 corresponds to the wiper shaft 156 from FIG. 1. The parallel arm shaft 270 represents an optional configuration of an exemplary embodiment with a second wiper shaft.

In other words, the exemplary embodiment in FIG. 2 shows a working piston which is a modular construction and which is composed of a specially manufactured module which accommodates the wiper shaft. On the central module there are mounted standardized cylinders in which the pistons can perform their movement. On the wiper shaft, or also on a parallel arm shaft that may be provided, there is situated a rotational angle encoder or rotational angle sensor (not illustrated here). The rotational angle encoder outputs, in a manner dependent on the wiper arm position or the wiper shaft or parallel arm shaft, a signal proportional to the present position angle. The signal may be a current signal from 4-20 mA, though could also be a voltage signal from for example 0-10 V. Also situated on the drive, on a dedicated mounting plate, is the valve unit. The valve unit may be positioned in the direct vicinity of the working piston, but is not exclusively restricted to this mounting location.

Figure 3:
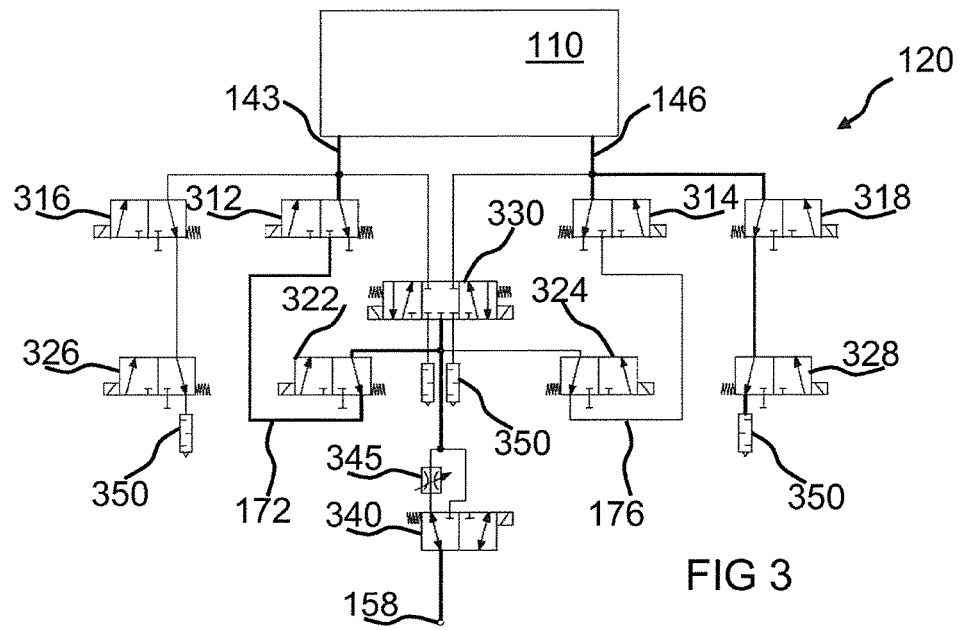
FIG. 3 is a diagrammatic illustration of a valve device of an electropneumatic windshield wiper drive for a rail vehicle according to an exemplary embodiment.

FIG. 3 is a diagrammatic illustration of a valve device 120 of an electropneumatic windshield wiper drive for a rail vehicle according to an exemplary embodiment. The electropneumatic windshield wiper drive may be the electropneumatic windshield wiper drive shown in FIG. 1 with a valve device 120. The valve device 120 has a first normal-operation valve 312, a second normal-operation valve 314, a third normal-operation valve 316 and a fourth normal-operation valve 318, a first emergency-operation valve 322, a second emergency-operation valve 324, a third emergency-operation valve 326, and a fourth emergency-operation valve 328, a further emergency-operation valve 330, an additional solenoid valve 340, and a throttle 345 connected downstream of the additional solenoid valve. All of the valves 312, 314, 316, 318, 322, 324, 326, 328, 330, 340 specified in the exemplary embodiment shown are valves with electromagnetic actuation and a return spring. The further emergency-operation valve 330 is a 5/3 directional valve with a blocking zero position, a forward position and a reverse position; all of the other specified valves 312, 314, 316, 318, 322, 324, 326, 328, 340 are 3/2 directional valves. In the case of the first normal-operation valve 312 and the second normal-operation valve 314, the inflow is blocked in the zero position. The third normal-operation valve 316 and the fourth normal-operation valve 318 exhibit free through-flow in the zero position. The at least two emergency-operation valves 322, 324, 306. 20, 328 exhibit free through-flow in the zero position.

The first normal-operation valve 312, the third normal-operation valve 316 and the further emergency-operation valve 330 are connected to the first port 143 of the drive 110. The second normal-operation valve 314, the fourth normal-operation valve 318 and the further emergency-operation valve 330 are connected to the first port 143 of the drive 110. The first normal-operation valve 312 is connected to the first emergency-operation valve 322. The second normal-operation valve 314 is connected to the second emergency-operation valve 324. The third normal-operation valve 316 is connected to the third emergency-operation valve 326. The fourth normal-operation valve 318 is connected to the fourth emergency-operation valve 328. The additional solenoid valve 340 is connected to the supply port 158 for the compressed-air supply. In the zero position of the additional solenoid valve 340, a throttle 345 is connected downstream of the additional solenoid valve 340. An outlet of the throttle 345 and an outlet of the additional solenoid valve 340 in the activated state are connected to the first emergency-operation valve 322, to the second emergency-operation valve 324 and to the further emergency-operation valve 330. The third emergency-operation valve 326 and the fourth emergency-operation valve 328 are each connected to a silencer 350. The further emergency-operation valve 330 is connected to two silencers 350. In a further exemplary embodiment which is not shown, the outlets, leading to the silencers 350, of the third emergency-operation valve 326, of the fourth emergency-operation valve 328 and of the further emergency-operation valve 330 are connected to one another and to one silencer 350. The silencer is then formed as one air outlet.

In FIG. 3, the lines conducting compressed air, that is to say the first normal-operation connection line 172 and a normal-operation air discharge line 362, are highlighted. For the operating state shown, in which the at least one piston or the power transmission device is to be moved from the first port 143 in the direction of the second port 146, the first normal-operation valve 312 and the third normal-operation valve 316 are active. In the operating state shown, the compressed air present at the additional solenoid valve 340 from the port for the compressed-air supply is conducted via the throttle 345, the first emergency-operation valve 322 and the first normal-operation valve 312 to the first port 143. At the same time, at the second port 146, the compressed air flows out via the fourth normal-operation valve 318, which exhibits free throughflow, the fourth emergency-operation valve 328, and the silencer 350. All other line paths are blocked.

To now realize an opposite direction of movement of the at least one piston, that is to say it is intended for the at least one piston or the power transmission device to be moved from the second port 146 in the direction of the first port 143, the second normal-operation valve 314 and the fourth normal-operation valve 318 are active. The compressed air present at the port for the compressed-air supply then flows via the additional solenoid valve 340, the second emergency-operation valve 324 and the second normal-operation valve 314 to the second port 146, and at the same time, the air at the first port 143 can flow out via the third normal-operation valve 316 and the third emergency-operation valve 326 and a silencer 350.

In a further exemplary embodiment which is not shown, the four emergency-operation valves 322, 324, 326, 328 illustrated in FIG. 3 may be replaced by only two emergency-operation valves. In this case, the first of the only two emergency-operation valves would be arranged between the first port 143 and the first normal-operation valve 312 and third normal-operation valve 316, wherein the further emergency-operation valve 330 remains directly connected to the first port 143. Analogously to this, the second of the only two emergency-operation valves would be arranged between the second port 146 and the second normal-operation valve 314 and fourth normal-operation valve 318, wherein the further emergency-operation valve 330 remains directly connected to the second port 146. This arrangement permits, in an emergency operation mode, the supply of air and discharge of air via the normal-operation valves 312, 314, 316, 318, as in the exemplary embodiment illustrated in FIG. 3, to be interrupted, such that in an emergency operation mode, control by way of the further emergency-operation valve 330 is made possible independently of the positions of the normal-operation valves 312, 314, 316, 318. The emergency-operation function of the pneumatic control arrangement shown in FIG. 3 is illustrated in the following FIG. 4.

Figure 4:
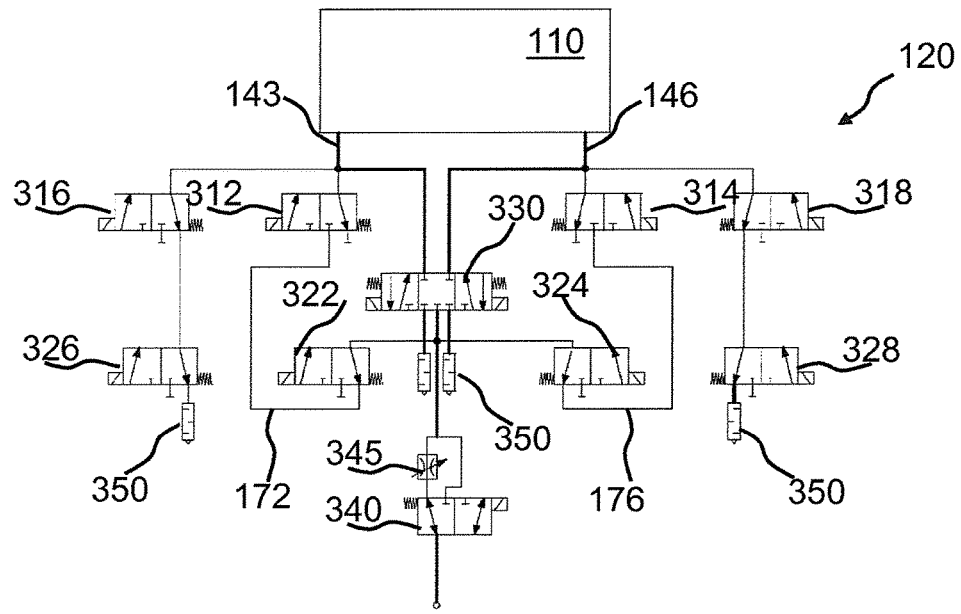
FIG. 4 is a diagrammatic illustration of a valve device of an electropneumatic windshield wiper drive for a rail vehicle according to an exemplary embodiment.

FIG. 4 is a diagrammatic illustration of a valve device 120 of an electropneumatic windshield wiper drive for a rail vehicle according to an exemplary embodiment. The illustration corresponds substantially to the diagrammatic illustration in FIG. 3, with the difference that an emergency operation function is illustrated. The four emergency-operation valves 322, 324, 346, 328 are active. The two possible switching positions of the further emergency-operation valve 330, which may be a 5/3 directional valve, are activated alternatively in timed fashion. The switching state of the four normal-operation valves 312, 314, 316, 318 is in this case irrelevant. In the zero state of the further emergency-operation valve 330, no change in the air pressure at the first port 143 and/or second port 146 occurs. Depending on the activated switching position of the further emergency-operation valve 330, the air pressure of the air flowing in via the additional solenoid valve 340 and the further emergency-operation valve 330 prevails at the first port 143, and the air at the second port 146 can flow out via the further emergency-operation valve 330 and the silencer 350, or vice versa, that is to say the air pressure of the air flowing in via the additional solenoid valve 340 and the further emergency-operation valve 330 prevails at the second port 146, and the air at the first port 143 can flow out via the further emergency-operation valve 330 and the silencer 350.

Figure 5:
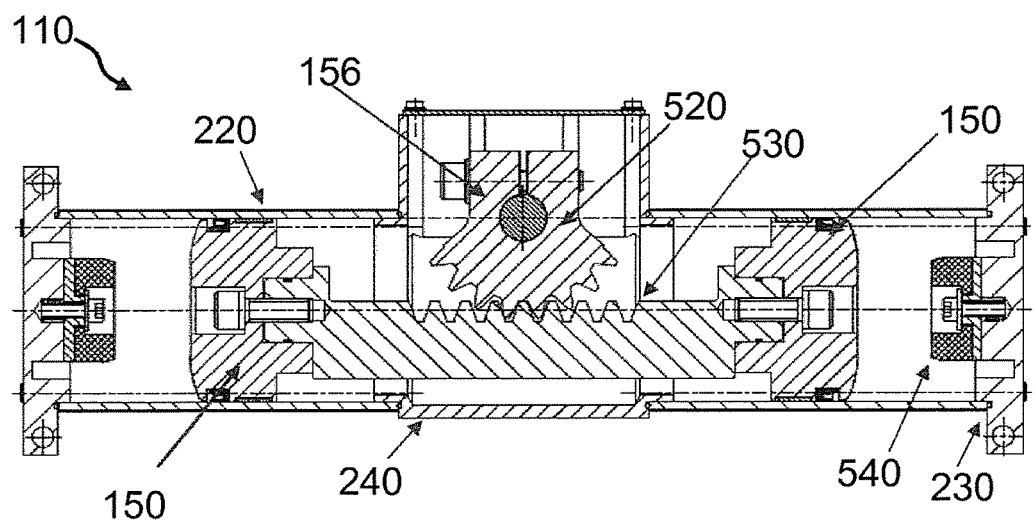
FIG. 5 shows a drive for an electropneumatic windshield wiper drive according to an exemplary embodiment.

FIG. 5 shows a drive 110 for an electropneumatic windshield wiper drive according to an exemplary embodiment. On two opposite sides of a central module 510, there is arranged in each case one cylinder barrel 220 composed of an extruded profile. The cylinder barrel 220 is sealed off, on the side situated opposite the central module 240, by way of a cylinder cover 230, wherein the two cylinder covers have pneumatic inlet lines, that is to say the first port in the first cylinder cover 230 and the second port in the second cylinder cover 230. A wiper shaft 156 is arranged in the central module 240. The wiper shaft 156 is perpendicular to a reference plane running through the axis, or the main direction of extent, of the cylinder barrel 220. The wiper shaft 156 is connected in non-positively locking and/or positively locking fashion to a toothed segment 520. The toothed segment 520 is in engagement with a toothed rack 530 which is arranged between two pistons 150 arranged in the cylinder barrel. One end of the toothed rack 530 is connected by way of a screw connection to the first piston 150 of the two pistons 150, and the opposite end of the toothed rack is connected by way of a screw connection to a second piston 150 of the two pistons 150. Seal rings between the pistons 150 and the cylinder barrel 220 seal off the chamber between the pistons 150 and the respectively associated cylinder cover 230 in fluid-tight fashion with respect to the central module 240. A linear movement of the pistons 150 and of the toothed rack 530 connected to the pistons 150 is converted into a rotational movement of the wiper shaft 156 by way of the toothed segment 520 which is in engagement with the toothed rack 530. On that side of the cylinder cover 230 which faces toward the cylinder barrel 220 there is arranged in each case one end position damper 540. A unit composed of piston 150, toothed rack 530 and toothed segment 520 may be referred to as power transmission device, as denoted in FIG. 1 by the reference sign 153. An exemplary embodiment with a power transmission device that differs from this is illustrated in FIG. 6.

Figure 6:
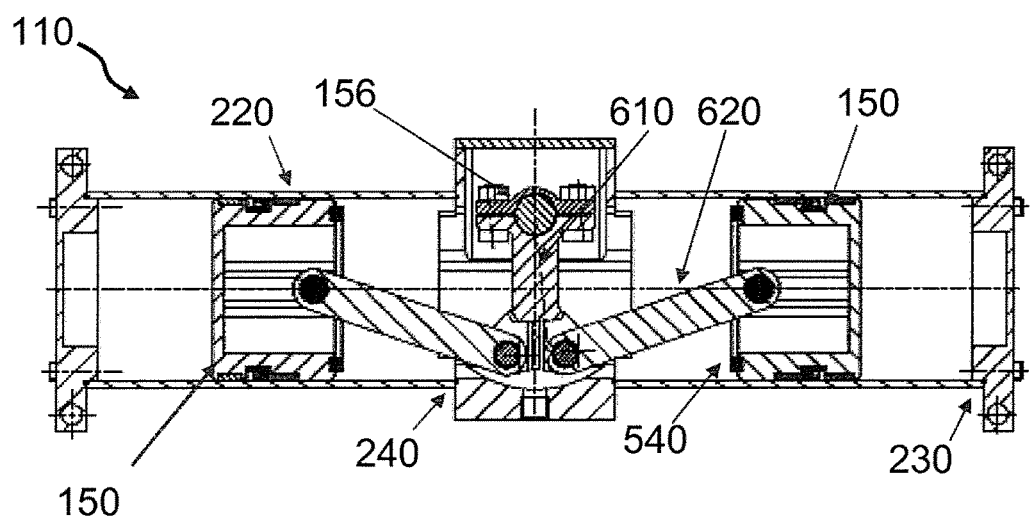
FIG. 6 shows a drive for an electropneumatic windshield wiper drive according to an exemplary embodiment.

FIG. 6 shows a drive 110 for an electropneumatic windshield wiper drive according to an exemplary embodiment. The drive 110 shown in FIG. 6 for an electropneumatic windshield wiper drive corresponds substantially to the drive 110 shown in FIG. 5, but differs in the design of the power transmission device. The power transmission device is realized by means of a crank rod which is connected in non-positively locking and/or positively locking fashion to the wiper spindle 156, and which is operatively connected by way of a connecting rod 620 to in each case one piston 150. In this exemplary embodiment, the pistons 150 each have an end position damper 540 for the connecting rod 620. The connecting rod 620 is the connection between the wiper shaft 156 and the piston 150 which moves back and forth. The connecting rod 620 converts the linear movement of the pistons 150 into the circular movement of the wiper shaft 156, that is to say into a linearly oscillating axial movement of the wiper shaft 156.

Figure 7:
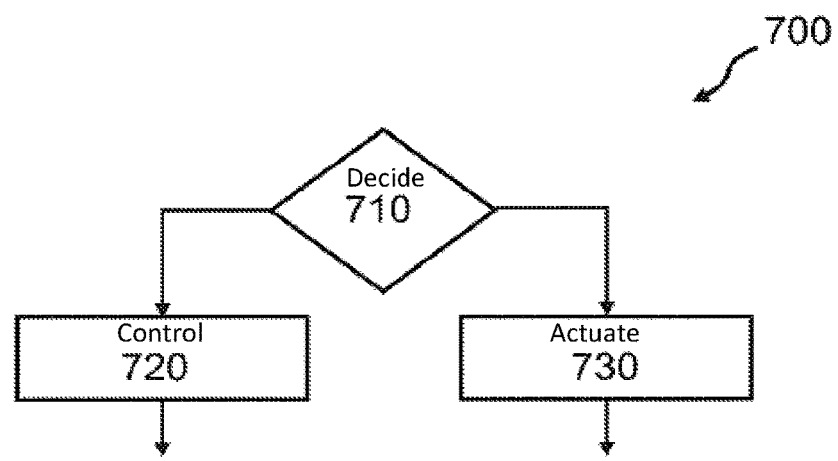
FIG. 7 shows a flow diagram of a method for controlling a pneumatic system for operating a drive for a windshield wiper for a rail vehicle according to an exemplary embodiment.

FIG. 7 shows a flow diagram of a method 700 for controlling a pneumatic system for operating a drive for a windshield wiper for a rail vehicle according to an exemplary embodiment. The drive may be the drive for a windshield wiper for a rail vehicle as shown in FIG. 1 and/or FIG.

2. The pneumatic system may be a pneumatic system depicted in FIG. 1 as valve device and/or the exemplary embodiment shown in FIG. 3. The method has three steps 710, 720, 730. The method 700 may be implemented by way of suitable devices of a control unit, as described on the basis of FIG. 1.

In a step 710 of deciding on the operation mode of the pneumatic system, a decision is made between a normal-operation mode and an emergency-operation mode. If a normal-operation valve of the four normal-operation valves is not operating correctly, the emergency-operation mode can be selected. An intervention by a user can also lead to the selection of the emergency-operation mode. Abnormal functioning of the drive may lead to a decision for the emergency-operation mode.

If, in the step 710 of deciding, the normal-operation mode has been selected, the step 720 of controlling the valve device is carried out. As a result of the step 720 being carried out, the supply port for the compressed-air supply is coupled via the first normal-operation connection line to the first port, and the second port is coupled to an air outlet. In alternation therewith, the port for the compressed-air supply is coupled via the second normal-operation connection line to the second port, and the first port is coupled to an air outlet, to effect the alternating rotational movement of the wiper shaft. In the step 720 of controlling, it is also possible for further modes to be implemented, such as interval operation or movement of the wiper blades into a wash tunnel position.

If, in the step 710 of deciding, the emergency-operation mode has been selected, the step 730 of actuating the valve device is carried out. As a result of the step 730 being carried out, the supply port of the compressed-air supply is coupled via the first emergency-operation connection line to the first port and the second port is coupled to an air outlet. In alternation therewith, the supply port for the compressed-air supply is coupled via the second emergency-operation connection line to the second port, and the first port is coupled to an air outlet, to effect the alternating rotational movement of the wiper shaft.

Figure 8:
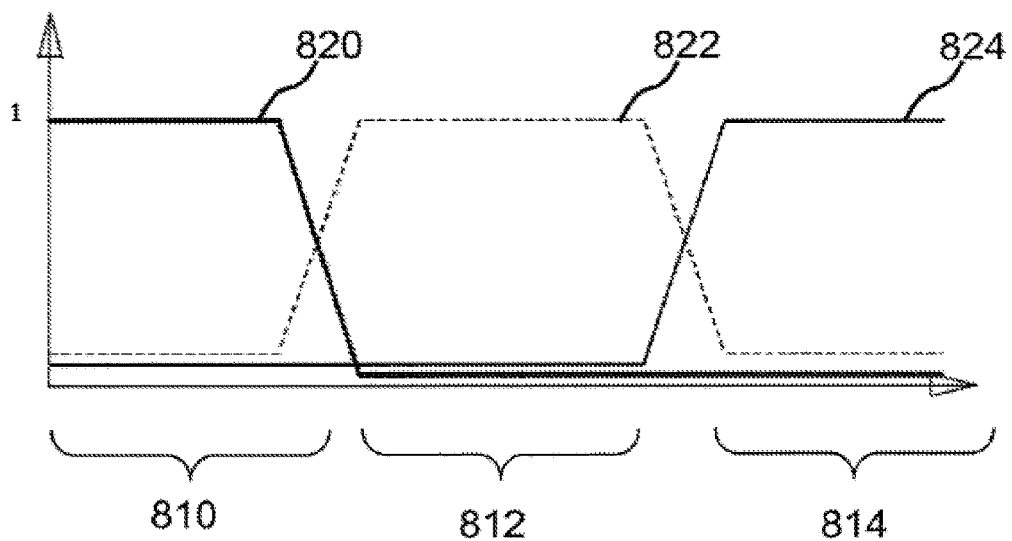
FIG. 8 shows a diagram with phases of a fuzzy regulator according to an exemplary embodiment.

FIG. 8 shows a diagram with phases of a fuzzy regulator according to an exemplary embodiment. In a Cartesian coordinate system, a wiper angle is plotted on the abscissa, and the valve state, that is to say zero state/rest state or active, is plotted on the ordinate. The diagram shows three phases 810, 812, 814 and the switching state of three normal-operation valves. The normal-operation valves may be the normal-operation valve 312 shown in FIG. 3, represented by the first graph 820, the second normal-operation valve 314, represented by the second graph 822, and the third normal-operation valve 316, represented by the third graph 824. In the first phase 810, the first graph 820 exhibits an active operating state, and the second graph 822 and the third graph 824 exhibit a rest state. At the transition from the first phase 810 to the second phase 812, the first graph 820 exhibits a transition from the active operation state into a rest state, and the second graph 822 exhibits a transition from the rest state into an active operation state. In the second phase 812, the second graph 822 exhibits an active operation state, and the first graph 820 and the third graph 824 exhibit a rest state. At the transition from the second phase 812 to the third phase 814, the second graph 822 exhibits a transition from the active operating state into a rest state, and the third graph 824 exhibits a transition from the rest state into an active operation state. In the third phase 814, the third graph 824 exhibits an active operation state, and the first graph 820 and the second graph 822 exhibit a rest state.

Figure 9:
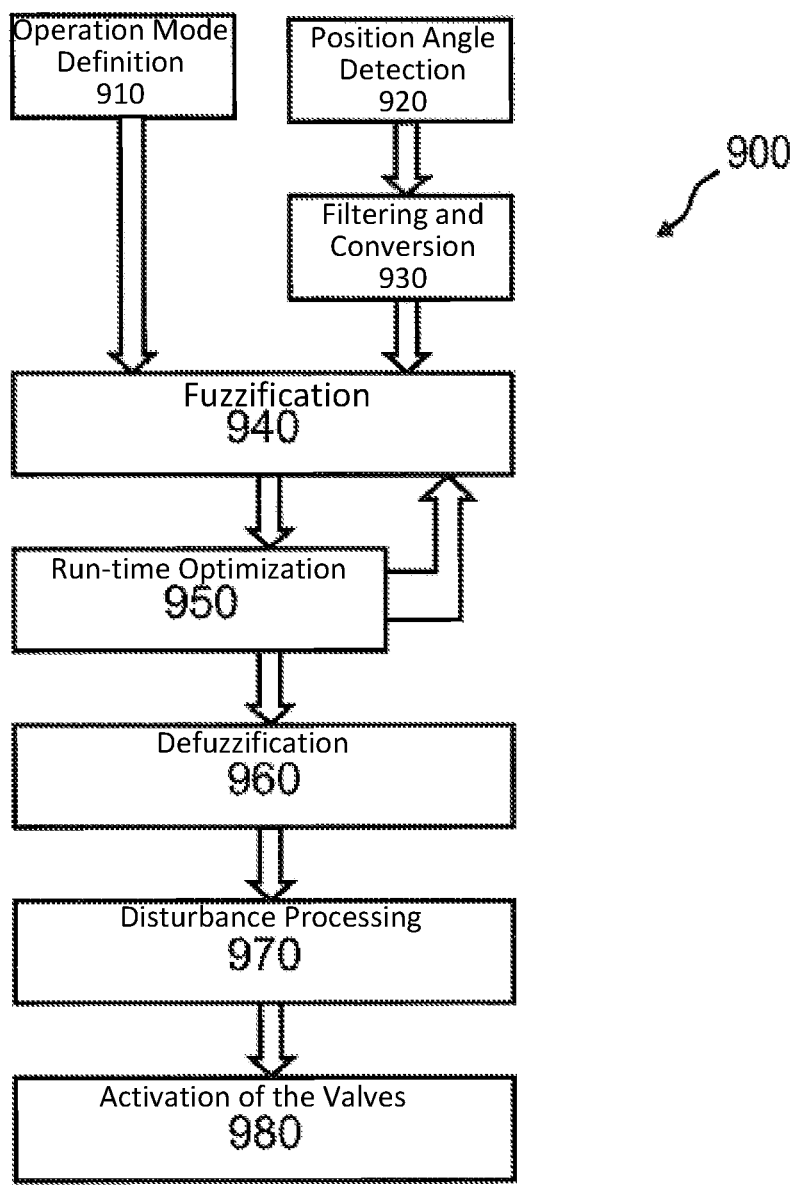
FIG. 9 shows a flow diagram of method steps of a fuzzy regulator according to an exemplary embodiment.

FIG. 9 shows a flow diagram of method steps of a fuzzy regulator 900 according to an exemplary embodiment. In a step 910, the operation mode is defined. In parallel therewith, in a step 920, at least one position angle of the wiper shaft is detected. The at least one position angle detected in step 920 is subjected to filtering and conversion in a step 930. The step 940 of fuzzification receives the result from step 910 of operation mode selection and from step 930 of filtering and conversion, and outputs its result to a step 950 of run-time optimization. The result of step 950 of run-time optimization is passed back to the step 940 of fuzzification as feedback and to a step 960 of defuzzification. In the subsequent step 970 of disturbance processing, any disturbances are processed, and the result is transmitted to step 980 of activation of the valves, or of provision of a process sequence.

The described exemplary embodiments have been selected merely as examples, and may be combined with one another.

On high-speed trains, owing to the required torques and the available pneumatic compressed-air supply, use is may be made of electropneumatic windshield wiper drives. A known electropneumatic drive is composed of a working piston, a control piston and, depending on the size and design of the drive, a damper piston. The drive performs wiping movements exclusively through the correct application of a compressed-air supply. The construction of such drives is very expensive, as numerous special components are required.

The patent DE 43 43 216 C2 discloses a pneumatic windshield wiper drive for rail vehicles, having a working piston, having a control piston, having a compressed air-actuable blocking piston for blocking the control piston in one of its end positions, two blocking pistons for blocking the working piston in an intermediate position, and two valves for ventilating the compressed-air inlet for the working piston and the control piston and/or ventilating the compressed-air inlet for the blocking piston of the control piston.

LIST OF REFERENCE NUMERALS

100 Electropneumatic windshield wiper drive
110 Drive
120 Pneumatic system
130 Control unit
140 Piston guide device
143 First port
146 Second port
150 At least one piston
153 Power transmission device
156 Wiper shaft
158 Supply port for a compressed-air supply
160 Compressed-air supply
172 First normal-operation connection line
174 First emergency-operation connection line
176 Second normal-operation connection line
178 Second emergency-operation connection line
180 Valve device
190 Rotary angle sensor
210 Cover of the pneumatic system
220 Cylinder barrel composed of extruded profile
230 Cylinder cover
240 Central module
250 Mounting plate
260 Main arm shaft
270 Parallel arm shaft 312 First normal-operation valve
314 Second normal-operation valve
316 Third normal-operation valve
318 Fourth normal-operation valve
322 First emergency-operation valve
324 Second emergency-operation valve
326 Third emergency-operation valve
328 Fourth emergency-operation valve
330 Further emergency-operation valve
340 Additional solenoid valve
345 Throttle
350 Silencer
510 Central module
520 Toothed segment
530 Toothed rack
540 End position damper
610 Crank rod
620 Connecting rod
700 Method for controlling a pneumatic system
710 Step of deciding
720 Step of control
730 Step of actuating
810 First phase
812 Second phase
814 Third phase
820 First graph
822 Second graph
824 Third graph
900 Method steps of a fuzzy regulator
910 Step of operation mode definition
920 Step of position angle detection
930 Step of filtering and conversion
940 Step of fuzzification
950 Step of run-time optimization
960 Step of defuzzification
970 Step of disturbance processing
980 Step 980 of activation of the valves

The invention claimed is:

1. A pneumatic system for operating a drive for a windshield wiper for a rail vehicle, wherein the drive has a piston guide device and a power transmission device, wherein the piston guide device has a first port and a second port situated opposite the first port and has a piston which is arranged in the piston guide device and which performs mutually opposite linear movements along a main direction of extension of the piston guide device, and wherein the power transmission device transmits the mutually opposite linear movements of the piston to a wiper shaft to effect an alternating rotational movement of the wiper shaft, the pneumatic system comprising:
a first normal-operation connection line and, parallel thereto, a first emergency-operation connection line designed to connect a supply port for a compressed-air supply of the pneumatic system to the first port of the drive;
a second normal-operation connection line and, parallel thereto, a second emergency-operation connection line designed to connect the supply port to the second port of the drive; and
a valve device designed such that, during normal operation of the pneumatic system, said valve device couples the supply port to the first port via the first normal-operation connection line and to the second port via the second normal-operation connection line to effect the alternating rotational movement of the wiper shaft such that, during emergency operation of the pneumatic system, said valve device couples the supply port to the first port via the first emergency-operation connection line and to the second port via the second emergency-operation connection line to effect the alternating rotational movement of the wiper shaft.

2. The pneumatic system of claim 1, wherein the valve device has four normal-operation valves, at least two emergency-operation valves, and at least one further emergency-operation valve, wherein a first normal-operation valve and a third normal-operation valve of the four normal-operation valves and at least one of the at least two emergency-operation valves are assigned to the first normal-operation connection line, and a second normal-operation valve and a fourth normal-operation valve and the at least one further emergency-operation valve are assigned to the second normal-operation connection line, wherein the at least one further emergency-operation valve is assigned to the first emergency-operation connection line and to the second emergency-operation connection line.

3. The pneumatic system of claim 2, wherein the first normal-operation valve and the third normal-operation valve are connectable to the first port and in which the second normal-operation valve and the fourth normal-operation valve are connectable to the second port, wherein the first normal-operation valve is connected to a first emergency-operation valve of the at least two emergency-operation valves, wherein the second normal-operation valve is connected to a second emergency-operation valve of the at least two emergency-operation valves, wherein the third normal-operation valve is connected to a third emergency-operation valve of the at least two emergency-operation valves, wherein the fourth normal-operation valve is connected to a fourth emergency-operation valve of the at least two emergency-operation valves, wherein the first emergency-operation valve, the second emergency-operation valve and the at least one further emergency-operation valve are connected to the supply port, wherein the first port is connectable by way of the third normal-operation valve and the third emergency-operation valve and/or by way of the at least one further emergency-operation valve to the supply port for the compressed-air supply.

4. The pneumatic system of claim 2, wherein the four normal-operation valves are 3/2 directional valves and/or the at least two emergency-operation valves are 3/2 directional valves and/or the further emergency-operation valve is a 5/3 directional valve, wherein the at least two emergency-operation valves exhibit free throughflow in a zero position, wherein the first normal-operation valve and the second normal-operation valve are designed such that the inflow is blocked in the zero position, and wherein the third normal-operation valve and fourth normal-operation valve exhibit free throughflow in the zero position, and wherein the further emergency-operation valve has a blocking zero position, a forward position and a reverse position, wherein the supply port and/or an exhaust air port are shut off from communication with the first and second normal operation valves by the at least two emergency-operation valves in an activated state.

5. The pneumatic system of claim 1, further comprising an additional solenoid valve connected downstream of the supply port, and wherein, in a zero position of the additional solenoid valve, a throttle is connected downstream of the additional solenoid valve.

6. An electropneumatic windshield wiper drive for a rail vehicle, the electropneumatic windshield wiper drive comprising:
a drive for a windshield wiper for a rail vehicle having a piston guide device and a power transmission device, wherein the piston guide device has a first port and a second port situated opposite the first port and has a piston arranged in the piston guide device, wherein the piston performs mutually opposite linear movements along main direction of extension of the piston guide device, wherein the power transmission device transmits the mutually opposite linear movements of the piston to a wiper shaft to effect an alternating rotational movement of the wiper shaft; and a pneumatic system comprising a first normal-operation connection line and, parallel thereto, a first emergency-operation connection line designed to connect a supply port for a compressed-air supply of the pneumatic system to the first port of the drive;

a second normal-operation connection line and, parallel thereto, a second emergency-operation connection line designed to connect the supply port to the second port of the drive; and a valve device designed such that, during normal operation of the pneumatic system, said valve device couples the supply port to the first port via the first normal-operation connection line and to the second port via the second normal-operation connection line to effect the alternating rotational movement of the wiper shaft such that, during emergency operation of the pneumatic system, said valve device couples the supply port to the first port via the first emergency-operation connection line and to the second port via the second emergency-operation connection line to effect the alternating rotational movement of the wiper shaft.

7. A drive for a windshield wiper for a rail vehicle, the drive comprising:
    a piston guide device with a first port and with a second port situated opposite the first port;
    two pistons coupled to one another and arranged in the piston guide device and which perform linear movements along a main direction of extension of the piston guide device; and
    a power transmission device for transmitting the linear movements of the two pistons to a wiper shaft to effect an alternating rotational movement of the wiper shaft, wherein the power transmission device is a connecting-rod connection between the two pistons, wherein a first of the two pistons is connected by way of a connecting rod to an end of a crank rod, and a second piston of the two pistons is connected by a further connecting rod to the end of the crank rod, wherein the crank rod effects the alternating rotational movement of the wiper shaft; and
    a pneumatic system coupled to the first and second port, the pneumatic system having a valve device with four normal-operation valves, at least two emergency-operation valves, and at least one further emergency-operation valve, wherein a first normal-operation valve and a third normal-operation valve of the four normal-operation valves and at least one of the at least two emergency-operation valves are assigned to the first normal-operation connection line, and a second normal-operation valve and a fourth normal-operation valve and the at least one further emergency-operation valve are assigned to the second normal-operation connection line, wherein the at least one further emergency-operation valve is assigned to the first emergency-operation connection line and to the second emergency-operation connection line.

8. The drive of claim 7, wherein the piston guide device comprises a cylinder barrel.

9. The drive of claim 8, further comprising a central module coupled to the cylinder barrel and the wiper shaft positioned in in the central module, wherein the wiper shaft is coupled to the crank rod at an end opposite the connecting rod and the further connecting rod.

10. A method for controlling a pneumatic system for operating a drive for a windshield wiper for a rail vehicle, wherein the drive has a piston guide device and a power transmission device, wherein the piston guide device has a first port and a second port situated opposite the first port and has a piston which is arranged in the piston guide device and which performs mutually opposite linear movements along a main direction of extension of the piston guide device, and wherein the power transmission device transmits the mutually opposite linear movements of the piston to a wiper shaft to effect an alternating rotational movement of the wiper shaft, the method comprising:
    deciding whether the pneumatic system will be operated in the operation mode of normal operation or in the operation mode of emergency operation;
    controlling a valve device of the pneumatic system such that a supply port for a compressed-air supply of the pneumatic system is coupled via a first normal-operation connection line to a first port and a second port is coupled to an air outlet, and in alternation therewith, the supply port is coupled via a second normal-operation connection line to the second port and the first port is coupled to an air outlet, to effect the alternating rotational movement of the wiper shaft, when the pneumatic system is operated in the operation mode of normal operation; and
    actuating the valve device such that the supply port is coupled via a first emergency-operation connection line to the first port and the second port is coupled to an air outlet, and in alternation therewith, the supply port is coupled via a second emergency-operation connection line to the second port and the first port is coupled to an air outlet, in order to effect the alternating rotational movement of the wiper shaft, when the pneumatic system is operated in the operation mode of emergency operation,
    wherein the valve device has four normal-operation valves and four emergency-operation valves, and
    wherein the first emergency operation connection line is arranged to interconnect the first port to a further emergency-operation valve via the first port.

11. A non-transitory computer program product with program code for carrying out the method of claim 10 when the program product is executed on an apparatus for controlling the pneumatic system.

12. An apparatus for controlling the pneumatic system, the apparatus comprising devices configured for executing the method for controlling an pneumatic windshield wiper drive for the rail vehicle as claimed in claim 10.

* * * * *